(12) United States Patent
Peng et al.

(10) Patent No.: US 8,750,081 B1
(45) Date of Patent: Jun. 10, 2014

(54) LIGHT DELIVERY

(71) Applicant: Seagate Technology LLC, Cupertino, CA (US)

(72) Inventors: Chubing Peng, Minnetonka, MN (US); Edward Charles Gage, Lakeville, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 13/722,036

(22) Filed: Dec. 20, 2012

(51) Int. Cl.
*G11B 11/00* (2006.01)

(52) U.S. Cl.
USPC ............................................... 369/13.33

(58) Field of Classification Search
USPC ................ 369/13.02, 13.13, 13.32, 13.33
See application file for complete search history.

(56) References Cited

U.S. PATENT DOCUMENTS

| | | | |
|---|---|---|---|
| 6,580,850 B1 | 6/2003 | Kazarinov et al. | |
| 6,762,977 B1 | 7/2004 | Gage et al. | |
| 6,944,112 B2 | 9/2005 | Challener | |
| 6,980,374 B1 | 12/2005 | Schlesinger | |
| 7,567,387 B2 | 7/2009 | Itagi et al. | |
| 8,064,741 B2 | 11/2011 | Cherchi et al. | |
| 8,085,473 B2 | 12/2011 | Itagi et al. | |
| 8,223,459 B2 * | 7/2012 | Gage et al. ........... | 360/235.4 |
| 2006/0187564 A1 | 8/2006 | Sato et al. | |
| 2006/0233062 A1 | 10/2006 | Bedillion et al. | |
| 2010/0123965 A1 | 5/2010 | Lee et al. | |
| 2011/0103201 A1 | 5/2011 | Peng et al. | |
| 2011/0227487 A1 | 9/2011 | Nichol et al. | |
| 2011/0228651 A1 | 9/2011 | Gage et al. | |
| 2011/0228652 A1 | 9/2011 | Gage et al. | |
| 2012/0201107 A1 | 8/2012 | Peng et al. | |
| 2012/0257490 A1 | 10/2012 | Zhou | |

FOREIGN PATENT DOCUMENTS

| | | |
|---|---|---|
| JP | 2004184986 A | 7/2004 |
| JP | 2007058900 A | 3/2007 |
| JP | 2007200475 A | 8/2007 |
| JP | 2007257753 A | 10/2007 |

OTHER PUBLICATIONS

Challener et al., "Heat-assisted magnetic recording by a near-field transducer with efficient optical energy transfer" Nature Photonics, vol. 3, Apr. 2009, www.nature.com/naturephotonics, pp. 220-236.
Challener et al., "Practical plasmonics," Nature Photonics, vol. 3, Apr. 2009, www.nature.com/naturephotonics, p. 236.

* cited by examiner

*Primary Examiner* — Brenda Bernardi
(74) *Attorney, Agent, or Firm* — HolzerIPLaw, PC

(57) ABSTRACT

A light delivery system in a slider includes a channel waveguide, a solid immersion mirror, a near field transducer, and a planar waveguide assembly. The solid immersion mirror focuses light to the near field transducer. In one implementation, the slider includes a first reflective element and a second reflective element formed in the slider to induce an offset between a light source and the near field transducer. The reflective elements redirect light received from a light source between the reflective elements to a focusing element (e.g., a solid immersion mirror) focused on a near field transducer. The reflective elements translate the light in accordance with the offset between the light source and the near field transducer.

18 Claims, 10 Drawing Sheets

LIGHT DELIVERY

SUMMARY

Implementations described and claimed herein provide a light delivery system in a slider including a channel waveguide, a solid immersion mirror, a near field transducer, and a planar waveguide assembly. The solid immersion mirror focuses light to the near field transducer. In one implementation, the slider includes a first reflective element and a second reflective element formed in the slider to induce an offset between a light source and the near field transducer. The reflective elements redirect light received from a light source between the reflective elements to a focusing element (e.g., a solid immersion mirror) focused on a near field transducer. The reflective elements translate the light in accordance with the offset between the light source and the near field transducer.

Other implementations are also described and recited herein.

BRIEF DESCRIPTIONS OF THE DRAWINGS

DETAILED DESCRIPTIONS

Implementations of the technology described herein may be employed in the context of a data storage system, although other applications may also be contemplated for light delivery using such technology.

Figure 1:
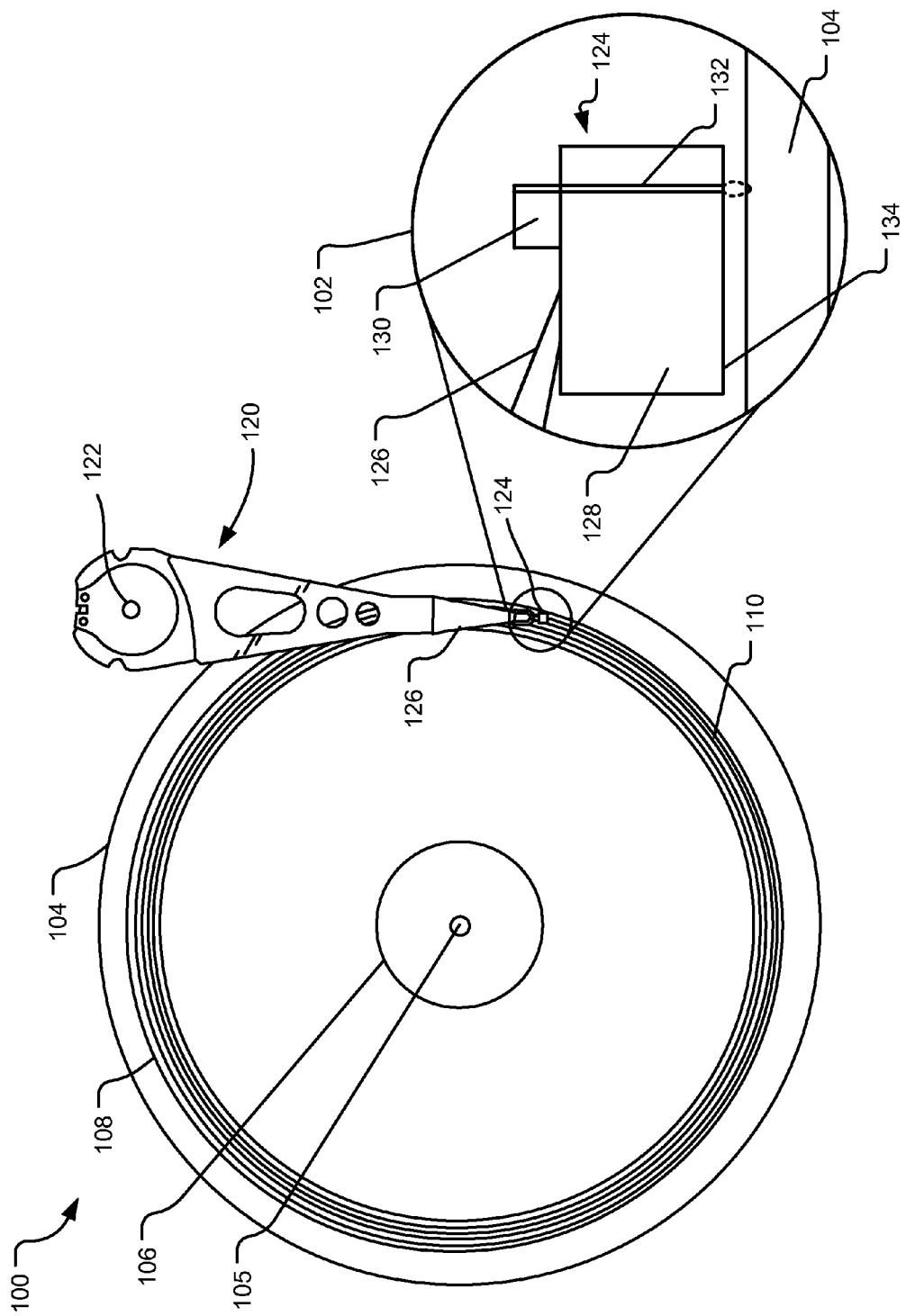
FIG. 1 illustrates a data storage device having an example light delivery system.

FIG. 1 illustrates a data storage device 100 having an example light delivery system, shown in more detail in an exploded view 102. Although other implementations are contemplated, in the illustrated implementation, the data storage device 100 includes a storage medium 104 (e.g., a magnetic data storage disc) on which data bits can be recorded using a magnetic write pole and from which data bits can be read using a magnetoresistive element. The storage medium 104 rotates about a spindle center or a disc axis of rotation 105 during rotation, and includes an inner diameter 106 and an outer diameter 108 between which are a number of concentric data tracks 110. It should be understood that the described technology may be used with a variety of storage formats, including continuous magnetic media, discrete track (DT) media, shingled media, etc.

Information may be written to and read from data bit locations in the data tracks on the storage medium 104. A transducer head assembly 124 is mounted on an actuator assembly 120 at an end distal to an actuator axis of rotation 122. The transducer head assembly 124 flies in close proximity above the surface of the storage medium 104 during disc rotation. The actuator assembly 120 rotates during a seek operation about the actuator axis of rotation 122. The seek operation positions the transducer head assembly 124 over a target data track for read and write operations.

In an implementation employing Heat-Assisted-Magnetic-Recording (HAMR), the recording action is assisted by a heat source applied to a bit location on the storage medium 104. The data bits (e.g., user data bits, servo bits, etc.) are stored in very small magnetic grains embedded within layers of the storage medium 104. The data bits are recorded in the magnetic grains within tracks 110 on the storage medium.

Generally, HAMR technology employs a storage medium (such as the storage medium 104) having a very high magnetic anisotropy, which contributes to thermal stability of the magnetization of the small magnetic grains in the storage medium 104. By temporarily heating the storage medium 104 during the recording process, the magnetic coercivity of the magnetic grains can be selectively lowered below an applied magnetic write field in a tightly focused area of the storage medium 104 that substantially corresponds to an individual data bit. The heated region is then rapidly cooled in the presence of the applied magnetic write field, which encodes the recorded data bit in the heated region based on the polarity of the applied magnetic write field. After cooling, the magnetic coercivity substantially returns to its pre-heating level, thereby stabilizing the magnetization for that bit. This write process is repeated for multiple data bits on the storage medium, and such data bits can be read using a magnetoresistive read head.

The exploded view 102 schematically illustrates a cross-sectional view of the transducer head assembly 124, as seen from a cross-track perspective. The transducer head assembly 124 is supported by a suspension 126 extending from the arm of the actuator assembly 120. In the implementation illustrated in the exploded view 102, the transducer head assembly 124 includes, among other features, a slider 128, a light source 130 (e.g., a laser), and a waveguide 132. An air-bearing surface 134 of the slider 128 "flies" across the surface of the storage medium 104, reading and writing data bits from and to the magnetic grains in the surface of the storage medium 104.

The light source 130 directs light into the waveguide 132, which has a high contrast in the refractive index between the waveguide core and its cladding. The light propagating through the waveguide 132 is focused by an optical focusing element, such as a planar solid immersion mirror (SIM), into a near-field-transducer (NFT) (not shown). Near field optics make use of apertures and/or antennas to cause a thermal increase in a data bit location on the surface of the storage medium 104 (e.g., via surface plasmon effects). As a result, data bit location on the surface is heated, selectively reducing the magnetic coercivity of the magnetic grains at the data bit location, relative to other areas of the surface. Accordingly, a magnetic field applied to the heated data bit location (as it cools) is sufficient to record a data bit at the location without disturbing data bits in adjacent, non-heated bit locations. In one implementation, the magnetic field is supplied to a write pole in the transducer head assembly 124, wherein the write pole is positioned in the near proximity of the NFT. In this manner, the heating area can substantially determine the writable area (e.g., the data bit dimension). There are various methods of launching light into a slider. In one implementation, free space light delivery involves directing light from free space to a grating coupler fabricated in a slider. In the implementation shown in FIG. 1, called laser-on-slider light delivery, the laser diode is butt-coupled to the waveguide 132. Yet another configuration, called laser-in-slider light delivery, also employs butt coupling, although other methods of light delivery may be employed.

Figure 2:
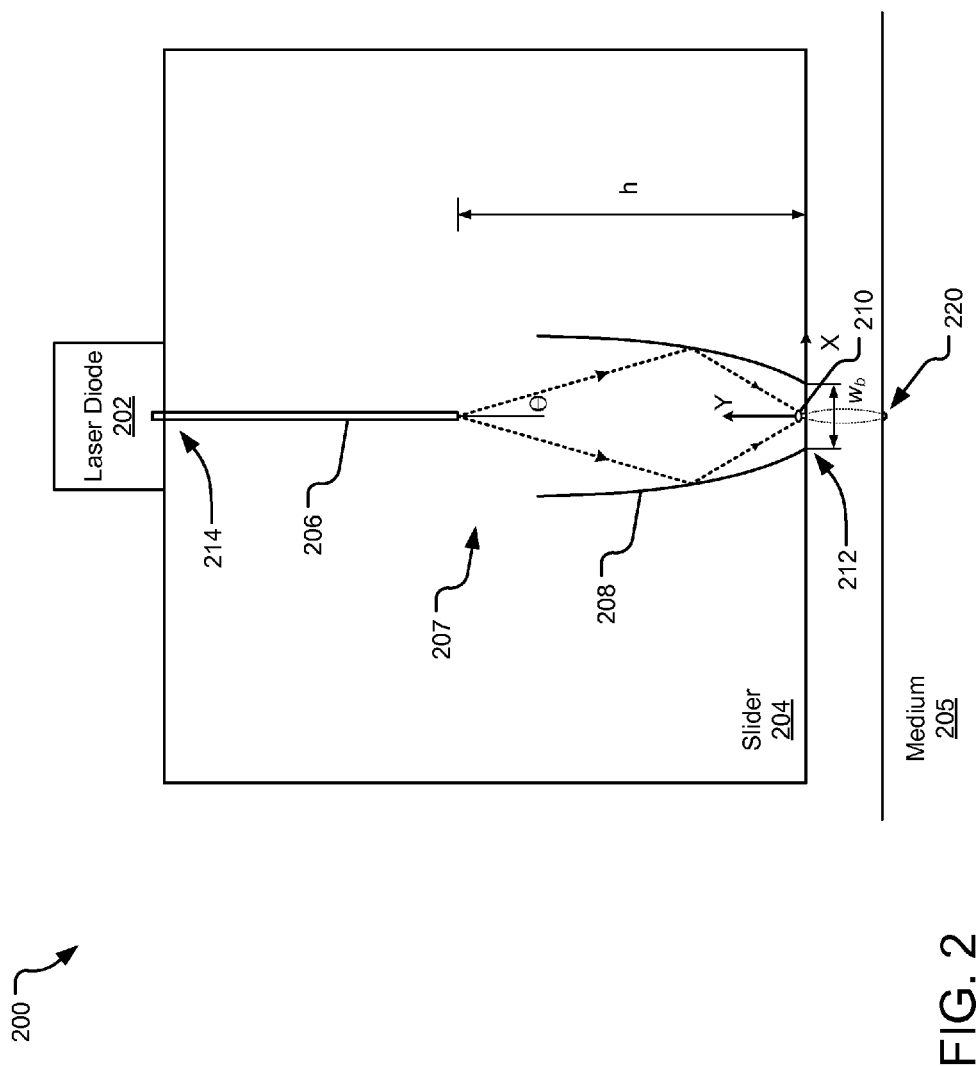
FIG. 2 illustrates an example light delivery system for a near-field-transducer-aligned light source.

FIG. 2 illustrates an example light delivery system 200 for a near-field-transducer-aligned light source (such as a laser diode 202). As shown, the laser diode 202 is affixed on the slider 204, which is in proximity to a storage medium 205. Light emitted from the laser diode 202 is coupled into a channel waveguide 206 by a waveguide input coupler, propagated through a planar waveguide 207, and focused by a SIM 208 to an NFT 210. The NFT 210 causes heating at a bit location 220 in the storage medium 205 (e.g., via surface plasmon effects). As shown in FIG. 2, the light-emitting output of the laser diode 202 is substantially aligned with the channel waveguide 206 and the NFT 210 along a single axis. In one implementation, the planar waveguide 207 and the SIM 208 are formed in a "planar waveguide assembly."

(X,Y) represent a right-handed Cartesian coordinate system, with the coordinate origin (x,y)=(0,0) at geometric focal point of the SIM. Although various shapes may be employed, in one implementation, the shape of the SIM 208 is elliptical and represented by $$\frac{c^2}{c^2 - h^2} x^2 + \left(y - \frac{h}{2}\right)^2 = \frac{c^2}{4} \quad 1(a)$$

$$c = \sqrt{\left(\frac{w_b}{2}\right)^2 + h^2} + \frac{w_b}{2} \quad 1(b)$$

where h represents the distance along the Y axis from the exit of the channel waveguide 206 to the SIM focal plan 212, c represents the optical path length, normalized by the effective mode index of the planar waveguide 207, and $w_b$ represents the SIM bottom width at the SIM focal plane 212, as shown in FIG. 2. In some implementations, $w_b$ is typically a few microns while the NFT width is typically smaller than a micron, although other dimensions and dimensional ratios may be employed.

As an example, given μPemto slider format of 700 μm×180 μm×850 μm and a waveguide input coupler of 100 μm in length, an h=80 μm may be employed. The light beam exiting the channel waveguide 206 is divergent, with a maximum half angular width of $\theta_{max}$. For light delivery efficiency, the optical rays at $\theta_{max}$ from the channel waveguide arrive at the rim of the top of the SIM 208 opening. The SIM collection efficiency and the range of angles of incidence on the SIM 208 are higher at lower values of $\theta_{max}$, which can be achieved with a wider output channel at the exit of the channel waveguide 206.

The maximum available channel waveguide width is limited by the cut-off of the first higher mode of the channel waveguide 206, and the optimal channel output end width is determined based on light delivery efficiency to the NFT 310 and for NFT excitation efficiency. Assuming a 150-nm thick $Ta_2O_5$ channel waveguide of refractive index n=2.09 with $Al_2O_3$ cladding layers (n=1.65), the maximum channel width for the fundamental transverse-electric (TE) mode cut-off may be computed to <1 μm. At a channel width=1 μm, $\theta_{max}$=25.7°, which yields 67% SIM collection efficiency. If a π-phase difference in the wave front of the left half of incident light beam from the right half of the incident beam is desired, a left-right (e.g., laterally) asymmetric SIM may be employed, such that the optical path from left and right optical rays has a π-phase difference.

Figure 3:
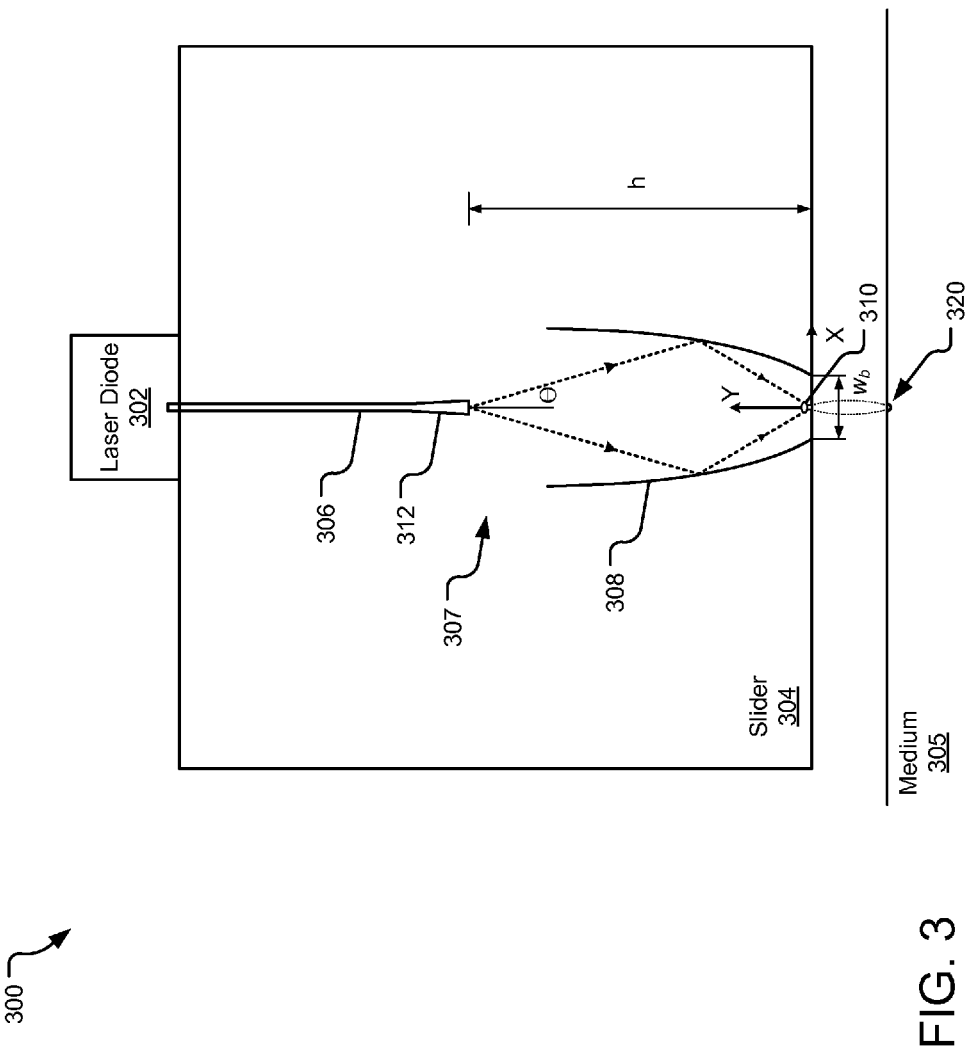
FIG. 3 illustrates another example light delivery system for a near-field-transducer-aligned light source.

FIG. 3 illustrates another example light delivery system 300 for a near-field-transducer-aligned light source (such as a laser diode 302). As shown, the laser diode 302 is mounted on the slider 304, which is in proximity to a storage medium 305. Light emitted from the laser diode 302 is coupled into a channel waveguide 306 by a waveguide input coupler, propagated through a planar waveguide 307, and focused by a SIM 308 to an NFT 310. The NFT 310 causes heating at a bit location 320 in the storage medium 305 (e.g., via surface plasmon effects). As shown in FIG. 3, the light-emitting output of the laser diode 302 is substantially aligned with the channel waveguide 306 and the NFT 310 along a single axis. In one implementation, the planar waveguide 307 and the SIM 308 are formed in a "planar waveguide assembly."

(X,Y) represent a right-handed Cartesian coordinate system, with the coordinate origin (x,y)=(0,0) at geometric focal point of the SIM. Although various shapes may be employed, in one implementation, the shape of the SIM 308 is elliptical and represented by Equations 1(a) and 1(b). If π-phase difference in the wave front of the left half of incident light beam from the right half of the incident beam is desired, a left-right (e.g., laterally) asymmetric SIM may be employed, such that the optical path from left and right optical rays has a π-phase difference.

The width of the channel waveguide 306 is smaller than the width of the channel waveguide 206 shown in the implementation of FIG. 2. The narrower channel waveguide 306 improves input coupling efficiency. To further improve light delivery to the NFT 310, a beam expander 312 is attached at the end of the channel waveguide 306, which suppresses the occurrence of high order modes and decreases $\theta_{max}$. In one example, $\theta_{max}$=15°, $w_b$=4.5 μm, and h=60 μm, yielding a 78% SIM collection efficiency.

Figure 4:
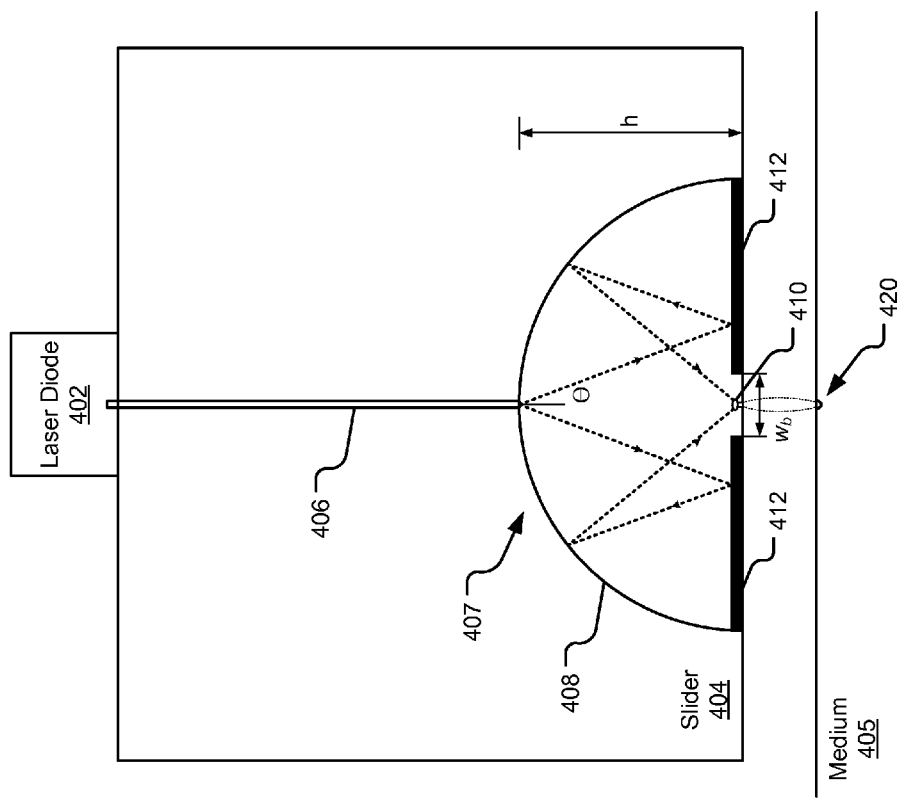
FIG. 4 illustrates yet another example light delivery system for a near-field-transducer-aligned light source.

FIG. 4 illustrates yet another example light delivery system 400 for a near-field-transducer-aligned light source (such as a laser diode 402). As shown, the laser diode 402 is mounted on the slider 404, which is in proximity to a storage medium 405. Light emitted from the laser diode 402 is coupled into a channel waveguide 406 by a waveguide input coupler, propagated through a planar waveguide 407, and focused by a SIM 408 to an NFT 410. The NFT 410 causes heating at a bit location 420 in the storage medium 405 (e.g., via surface plasmon effects). As shown in FIG. 4, the light-emitting output of the laser diode 402 is substantially aligned with the channel waveguide 406 and the NFT 410 along a single axis. (X,Y) represent a right-handed Cartesian coordinate system, with the coordinate origin (x,y)=(0,0) at geometric focal point of the SIM. In the illustrated implementation, two reflective elements 412 are placed at the sides of the bottom of the SIM 408. In one implementation, the planar waveguide 407, the SIM 408, and the reflective elements 412 are formed in a "planar waveguide assembly."

Although various shapes may be employed, in one implementation, the shape of the SIM 408 can be represented as follows, where t represents the thickness of the reflective elements 412:

$$x = \frac{4h(h-t)\sin\theta}{(3h-2t) - (h-2t)\cos\theta} \quad 2(a)$$

$$y = \frac{4h(h-t)\cos\theta}{(3h-2t) - (h-2t)\cos\theta} - (h-2t) \quad 2(b)$$

Figure 5:
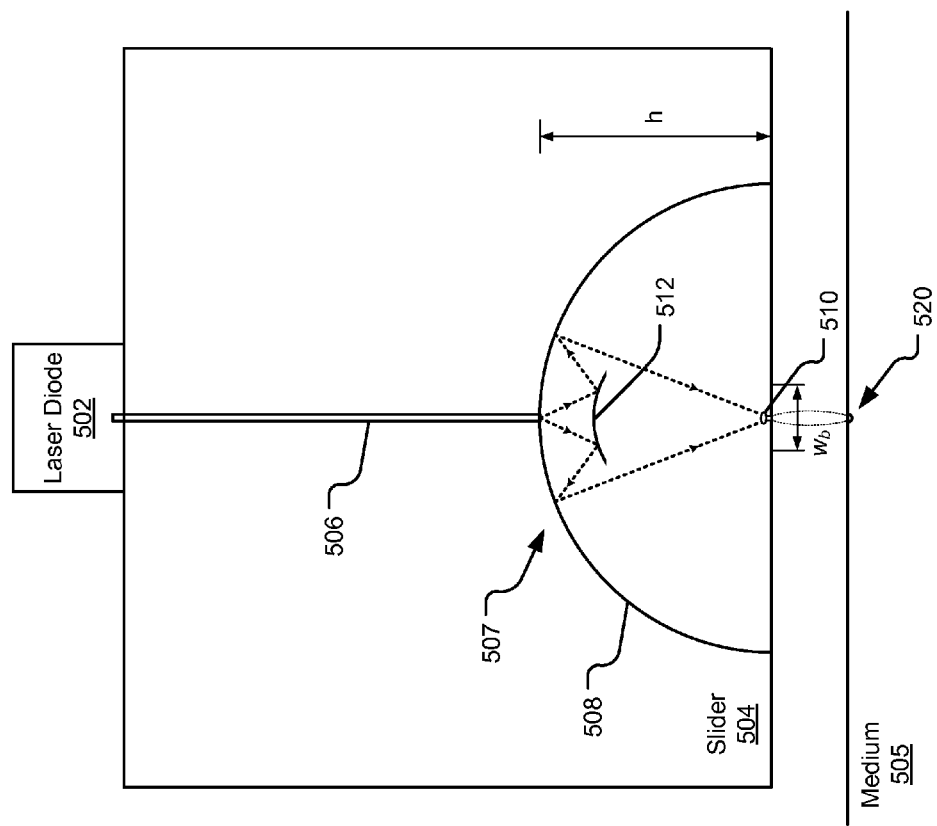
FIG. 5 illustrates yet another example light delivery system for a near-field-transducer-aligned light source.

FIG. 5 illustrates yet another example light delivery system 500 for a near-field-transducer-aligned light source (such as a laser diode 502). As shown, the laser diode 502 is mounted on the slider 504, which is in proximity to a storage medium 505.

Light emitted from the laser diode 502 is coupled into a channel waveguide 506 by a waveguide input coupler, propagated through a planar waveguide 507, and focused by a SIM 508 to an NFT 510. The NFT 510 causes heating at a bit location 520 in the storage medium 505 (e.g., via surface plasmon effects). As shown in FIG. 5, the light-emitting output of the laser diode 502 is substantially aligned with the channel waveguide 506 and the NFT 510 along a single axis.

(X,Y) represent a right-handed Cartesian coordinate system, with the coordinate origin (x,y)=(0,0) at geometric focal point of the SIM. In the illustrated implementation, a second reflective element 512 is placed at the sides of the geometric focal points of the SIM 508. In one implementation, the planar waveguide 507, the SIM 508, and the reflective element 512 are formed in a "planar waveguide assembly." Although various shapes may be employed, in one implementation, the shape of the SIM 508 can be represented by Equations 2(a) and 2(b). If π-phase in the wave front of the left side of incident light beam from the right side of the incident beam is desired, a left-right (e.g., laterally) asymmetric SIM 508 may be employed, such that the optical path from left and right optical rays has a π-phase difference.

Figure 6:
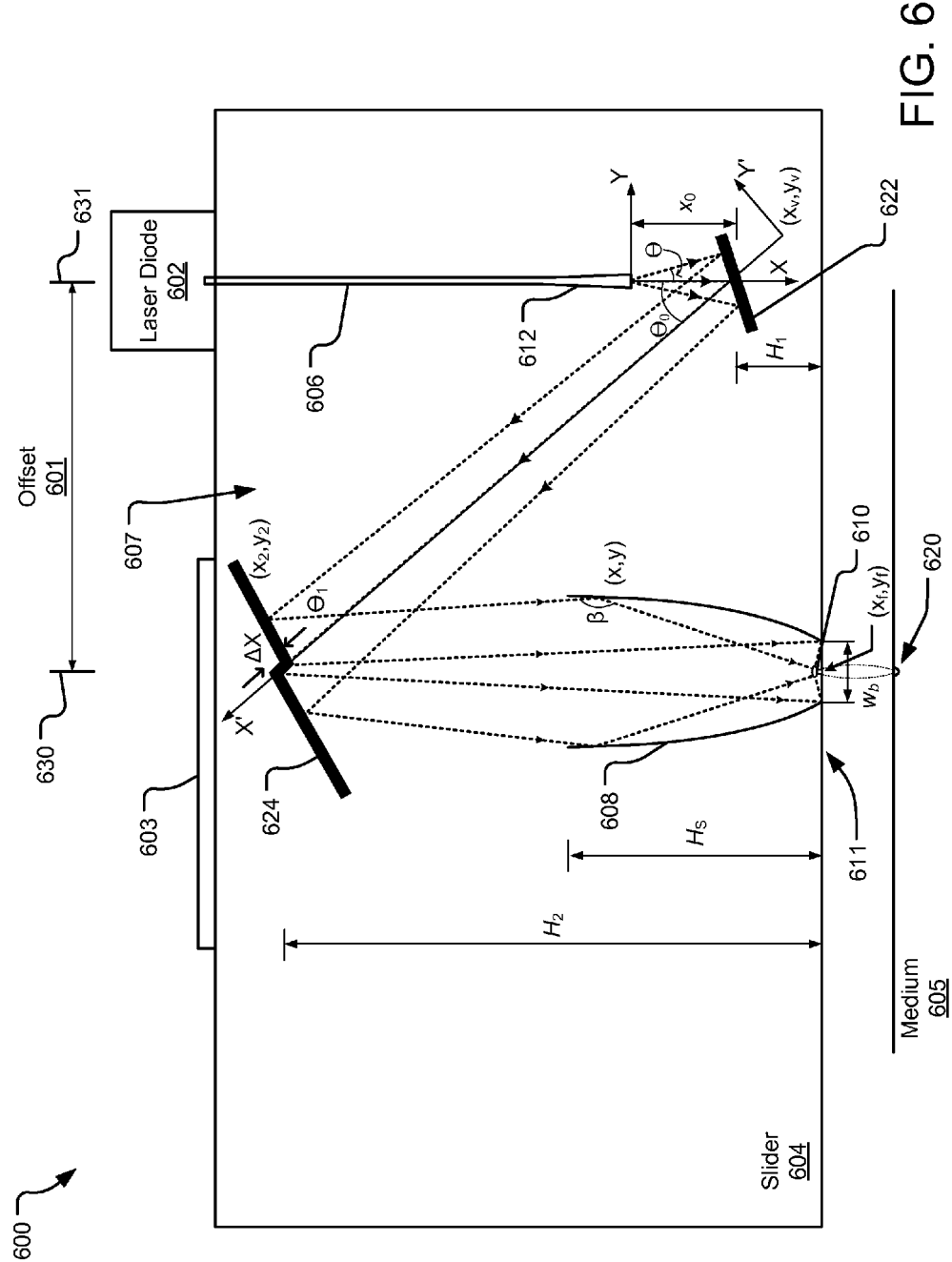
FIG. 6 illustrates an example light delivery system for a near-field-transducer-offset light source.

FIG. 6 illustrates an example light delivery system 600 for a near-field-transducer-offset light source (such as a laser diode 602). As shown, the laser diode 602 is mounted on the slider 604, which is in proximity to a storage medium 605. Light emitted from the laser diode 602 is coupled into a channel waveguide 606 by a waveguide input coupler (e.g., via butt coupling) along a first axis of the slider 604, propagated through a planar waveguide 607, and focused by a SIM 608 to an NFT 610 along a second axis of the slider 604. To improve the position alignment tolerance between the channel waveguide 606 and the rest of the optical system, and to shape the light beam, a beam expander 612 is attached at the end of the channel waveguide 606, which suppresses the occurrence of high order modes and decreases $\theta_{max}$. The NFT 610 causes heating at a bit location 620 in the storage medium 605 (e.g., via surface plasmon effects).

In contrast to the implementations shown in FIGS. 2, 3, 4, and 5, the implementation shown in FIG. 6 introduces an offset 601 (e.g., 100 μm) between the axis 631 of the laser diode 602 and the axis 630 of the NFT 610. Such an offset 601 can make room on the top of the slider 604 for other features, such as a bonding pad 603. The offset 601 also filters out most of the light that is not coupled into the channel waveguide 606 from the laser diode 602, which eases the assembly of the laser diode submount onto the slider 604. In the illustrated implementation, two reflector elements 622 and 624 may be employed to accommodate the offset 601, directing the optical rays from the offset laser diode 602 to the NFT 610 located substantially in the center of the slider 604. It should be understood that such offsetting configurations need not be limited to use with a slider-centered NFT. The reflective element 622 may be flat, concave, convex, or otherwise configured to yield a desired size of light beam incident on the SIM 608. The reflective element 624 performs as a collimating element to collimate the light beam into the SIM 608. Although various shapes may be employed, in one implementation, the shape of the SIM 608 substantially parabolic.

As an example, given a slider format of 700 μm×180 μm×850 μm, a waveguide input coupler of 100 μm in length, and beam expander of ~50 μm in length, the beam exiting from the channel waveguide 606 and beam expander 612 is divergent, with a maximum half angular width $\theta_{max}$. The reflective element 622 is the light delivery system 600 is a distance of $x_0$ from the end of the beam expander 612 and shown as flat, resulting in a beam size on the SIM 608 of ~50 μm. The distance from the reflective element 622 to the SIM focal plane 611 is designated as $H_1$ and that of the reflective element 624 is designated as $H_2$. $H_S$ represents the height of the SIM 608 as measured from the SIM focal plane 611. (X,Y) represents a right-handed Cartesian coordinate system, with the coordinate origin (x,y)=(0,0) at the output of the channel waveguide 606 and beam expander 612, with the X-axis aligned with the channel waveguide 606. In one implementation, the planar waveguide 607, the SIM 608, and the reflective elements 622 and 624 are formed in a "planar waveguide assembly."

The reflective element 622 is shown as flat, rotated counterclockwise from the X axis by $\theta_{max}/2$, and located at a distance of $x_0$ from the end of the beam expander 612. The reflective element 622 reflects the central ray existing from the beam expander 612 at an angle $\theta_0$, as determined by the offset 601 and the relative distance between the reflective elements 622 and 624:

$$\theta_0 = \tan^{-1}\left(\frac{\text{offset}}{H_2 - H_1}\right)$$

In one example, $H_2$=180 μm, $H_1$=48 μm, offset=102 μm, and $\theta_0$=37.694°.

The beam divergent angle from the beam expander (i.e., $\theta_{max}$) is small, so Gaussian beam approximation can be used to trace the light beam propagating between the reflective elements 622 and 624. In first-order Gaussian optics, beam reflections from a flat mirror (e.g., the reflective element 622) may be modeled by placing a virtual source located at $(x_v, y_v)$ behind the mirror in the (X,Y) coordinate system:

$$x_v = x_0[1 + \cos(\theta_0)] \quad \quad 3(a)$$

$$y_v = x_0 \sin(\theta_0) \quad \quad 3(b)$$

The reflective element 624 is a canted parabolic collimator. To prevent light loss in the central gap of the SIM 608, a canted collimator may be employed to direct the light into the two SIM sidewalls, as shown in FIG. 6. The reflective element 624 may also have a split, Δx, as shown in FIG. 6, to introduce a phase shift between the two split beams to the SIM sidewalls. For example, if a π-phase difference is desired, $$\Delta x = 0.5 \frac{\lambda}{n_{\text{eff}}}$$

where λ represents the light wavelength in a vacuum and $n_{\text{eff}}$ represents the effective mode index of the planar waveguide. (X',Y') represents another a right-handed Cartesian coordinate system, with the coordinate origin (x,y)=(0,0) at $(x_v, y_v)$. The X' axis is parallel to the central ray reflected from the reflective element 622. The transformation between the (X,Y) coordinate system and the (X',Y') coordinate system is shown by:

$$\begin{pmatrix} x' \\ y' \end{pmatrix} = \begin{pmatrix} -\cos\theta_0 & -\sin\theta_0 \\ -\sin\theta_0 & \cos\theta_0 \end{pmatrix} \begin{pmatrix} x - x_v \\ y - y_v \end{pmatrix}$$

$$\begin{pmatrix} x - x_v \\ y - y_v \end{pmatrix} = \begin{pmatrix} -\cos\theta_0 & -\sin\theta_0 \\ -\sin\theta_0 & \cos\theta_0 \end{pmatrix} \begin{pmatrix} x' \\ y' \end{pmatrix}$$

An optical ray exiting from the beam expander 612 at an angle of θ intersects the reflective element 622 at $(x_1,y_1)$, the reflective element 624 at $(x_2,y_2)$, and the SIM 608 at $(x,y)$:

$$x_1 = \frac{x_0}{1 + \tan(\theta)\tan\left(\frac{\theta_0}{2}\right)}$$

$$y_1 = x\tan(\theta)$$

$$x'_2 = \frac{x'_{02}\cos(\theta)}{\cos^2(\theta + \theta_2)}[1 - \sin(\theta + \theta_2)]$$

$$y'_2 = x\tan(\theta)$$

where $$x'_{02} = [1 + \sin(\theta_2)]x_{02}$$

$$\theta_2 = \frac{\pi}{2} - \theta_1$$

$$x_{02} = \begin{cases} x_{02p} - 0.5\Delta x & \text{for the upper sector} \\ x_{02p} + 0.5\Delta x & \text{for the lower sector} \end{cases}$$

$$x_{02p} = \sqrt{(\text{offset})^2 + (H_2 - H_1)^2} + x_0$$

$$\theta_1 = \begin{cases} \theta_0 - \Delta\theta & \text{for the upper sector} \\ \theta_0 + \Delta\theta & \text{for the upper sector} \end{cases}$$

$$\Delta\theta_0 = \tan\left(\frac{0.5w_b}{H_2}\right)$$

$$x' = x'_f + \sin(\theta_2)\left\{(x'_2 - x'_f)\cos(\theta_2)\cot(\theta_2) - (y'_2 - y'_f)\cos\theta_2 - \frac{x'_{03}}{2} + \frac{1}{2x'_{03}}[(x'_2 - x'_f)\cos\theta_2 - (y'_2 - y'_f)\sin\theta_2]^2\right\}$$

$$y' = y'_2 + \tan(\theta_1)(x' - x'_2) = y'_2 + \cot(\theta_2)(x' - x'_2)$$

For the left SIM sidewall:

$$\begin{pmatrix} x'_b \\ y'_b \end{pmatrix} = \begin{pmatrix} -\cos\theta_0 & -\sin\theta_0 \\ -\sin\theta_0 & \cos\theta_0 \end{pmatrix}\begin{pmatrix} x_f - x_v \\ y_f - 0.5w_b - y_v \end{pmatrix}$$

$$\frac{dy'}{dx'} = -\cot\left(\theta_0 + \frac{\Delta\theta_0}{2} + \frac{\pi}{4}\right)$$

For the right SIM sidewall:

$$\begin{pmatrix} x'_b \\ y'_b \end{pmatrix} = \begin{pmatrix} -\cos\theta_0 & -\sin\theta_0 \\ -\sin\theta_0 & \cos\theta_0 \end{pmatrix}\begin{pmatrix} x_f - x_v \\ y_f + 0.5w_b - y_v \end{pmatrix}$$

$$\frac{dy'}{dx'} = -\cot\left(\theta_0 - \frac{\Delta\theta_0}{2} - \frac{\pi}{4}\right)$$

Based on the foregoing, $(x'_2, y'_2)$ and $(x',y')$ represent the ray intersection at the reflective element 624 and the ray intersection at the SIM 608 in the local coordinate system, respectively. Likewise, $(x'_f, y'_f)$ represents the coordinates of the SIM focal point in the local coordinate system, and $w_b$ represents the width of the bottom opening of the SIM 608 at the focal plane.

Figure 7:
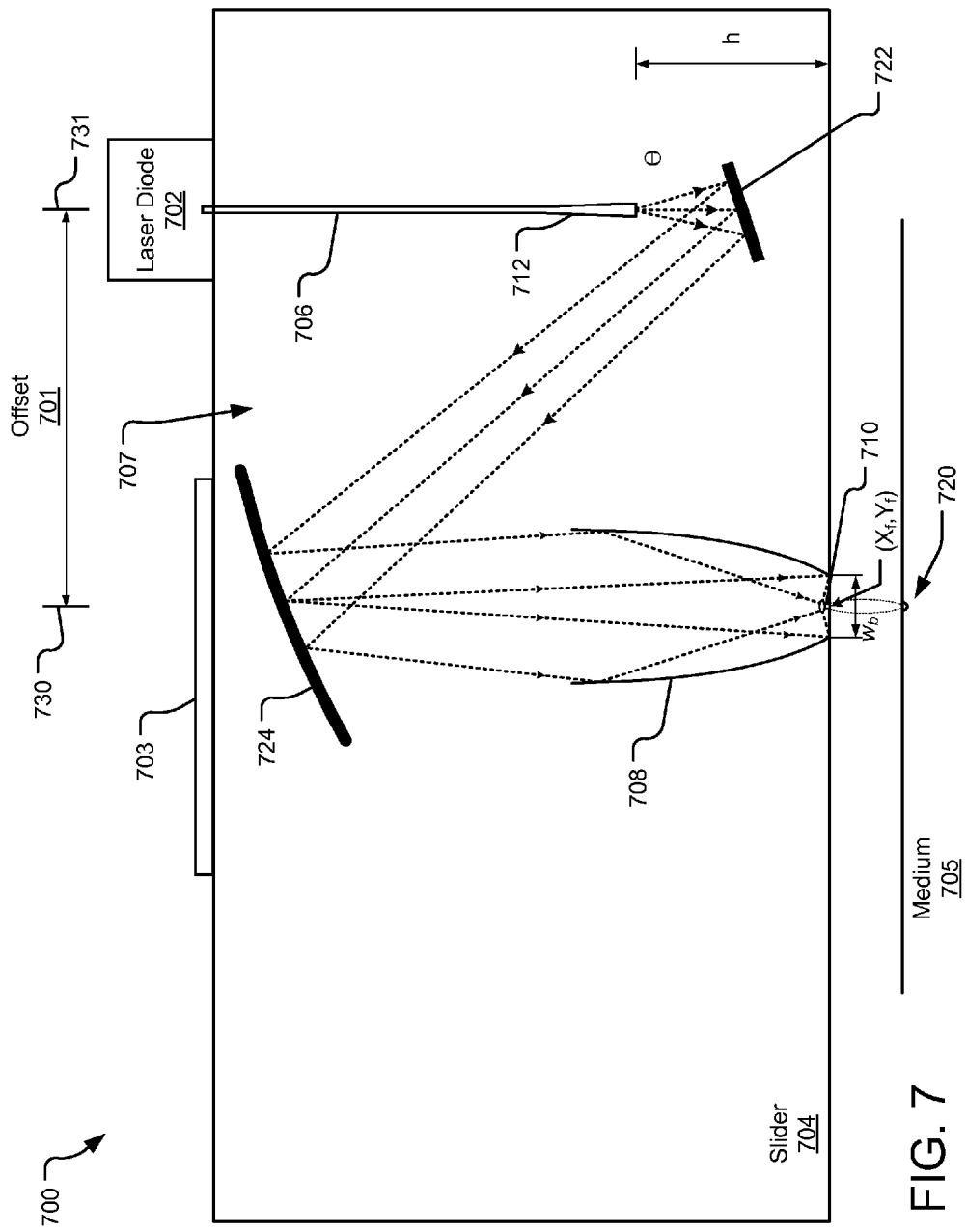
FIG. 7 illustrates another example light delivery system for a near-field-transducer-offset light source.

FIG. 7 illustrates another example light delivery system 700 for a near-field-transducer-offset light source (such as a laser diode 702). As shown, the laser diode 702 is mounted on the slider 704, which is in proximity to a storage medium 705. Light emitted from the laser diode 702 is coupled into a channel waveguide 706 by a waveguide input coupler, expanded by a beam expander 712, propagated through a planar waveguide 707, and focused by a canted SIM 708 to an NFT 710. The NFT 710 causes heating at a bit location 720 in the storage medium 705 (e.g., via surface plasmon effects).

In contrast to the implementations shown in FIGS. 2, 3, 4, and 5, the implementation shown in FIG. 7 introduces an offset 701 (e.g., 100 μm) between the laser diode 702 coupled channel waveguide 706 and the NFT 710. Such an offset 701 can make room on the top of the slider 704 for other features, such as a bonding pad 703. In the illustrated implementation, two reflector elements 722 and 724 may be employed to accommodate the offset 701 between the axis 731 of the laser diode 702 and the axis 730 of the NFT 710, directing the optical rays from the offset laser diode 702 to the NFT 710 located substantially in the center of the slider 704. It should be understood that such offsetting configurations need not be limited to use with a slider-centered NFT. The reflective element 722 may be flat, concave, convex, or otherwise configured to yield a desired size of light beam incident on the SIM 708. The reflective element 724 performs as a canted collimating element to collimate the light beam into the SIM 708. Although various shapes may be employed, in one implementation, the shape of the SIM 708 is substantially parabolic. In one implementation, the planar waveguide 707, the SIM 708, and the reflective elements 722 and 724 are formed in a "planar waveguide assembly."

In contrast to the collimating reflective element 624 of FIG. 6, the reflecting element 724 in FIG. 7 does not include a split (e.g., $\Delta x=0$). To determine the light beam size on the SIM 708, Gaussian beam propagation may be employed. Assuming the $w_0$ is the beam radius at its 1/e amplitude point at the exit of the beam expander 712, the Rayleigh length, $$z_R = \frac{\pi w_0^2}{\lambda}$$

which corresponds to a distance of propagation to a point where the $1/e^2$ radius of the beam is $\sqrt{2}$ times that at the beam waist, or the on-axis intensity of the beam is one-half of that at the beam waist. The beam waist is at the $x_{02}$ distance from the reflective element 724. In this manner, the beam size $w_1$ at the beam waist after the reflective element 724 is given by:

$$w_2 = \frac{x_{02}}{z_R}w_0$$

Figure 8:
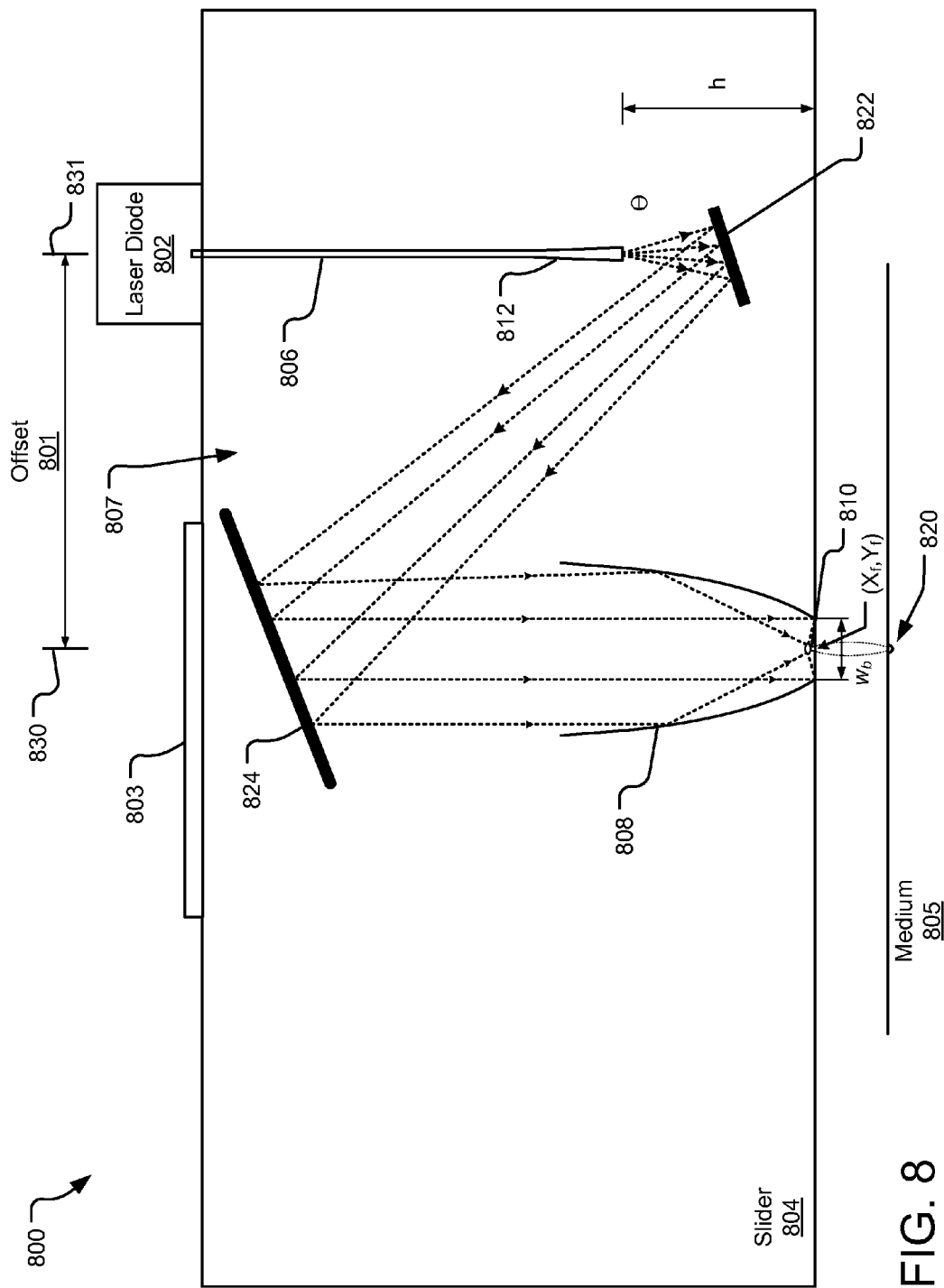
FIG. 8 illustrates yet another example light delivery system for a near-field-transducer-offset light source.

FIG. 8 illustrates yet another example light delivery system 800 for a near-field-transducer-offset light source (such as a laser diode 802). As shown, the laser diode 802 is mounted on the slider 804, which is in proximity to a storage medium 805. Light emitted from the laser diode 802 is coupled into a channel waveguide 806 by a waveguide input coupler, propagated through a planar waveguide 807, and focused by a SIM 808 to an NFT 810. To further improve light delivery to the NFT 810 and allow more alignment tolerance between the channel waveguide 806 and the rest of the optical elements (e.g., see reflector elements 822 and 824, and the SIM 808), a beam expander 812 is attached at the end of the channel waveguide 806, which suppresses the occurrence of high order modes and decreases $\theta_{max}$. The NFT 810 causes heating at a bit location 820 in the storage medium 805 (e.g., via surface plasmon effects).

In contrast to the implementations shown in FIGS. 2, 3, 4, and 5, the implementation shown in FIG. 8 introduces an offset 801 (e.g., 100 µm) between the laser diode 802 coupled channel waveguide 806 and the NFT 810. Such an offset 801 can make room on the top of the slider 804 for other features, such as a bonding pad 803. In the illustrated implementation, two reflector elements 822 and 824 may be employed to accommodate the offset 801 between the axis 830 of the laser diode 802 and the axis 831 of the NFT 810, directing the optical rays from the offset laser diode 802 to the NFT 810 located substantially in the center of the slider 804. It should be understood that such offsetting configurations need not be limited to use with a slider-centered NFT. The reflective element 822 may be flat, concave, convex, or otherwise configured to yield a desired size of light beam incident on the SIM 808. The reflective element 824 performs as a collimating element to collimate the light beam into the SIM 808, but in contrast to the reflective element 724 of FIG. 7, the reflective element 824 and the SIM 808 are not canted. Although various shapes may be employed, in one implementation, the shape of the SIM 808 is substantially parabolic. In one implementation, the planar waveguide 807, the SIM 808, and the reflective elements 822 and 824 are formed in a "planar waveguide assembly."

By removing the cant from both the reflective element 824 and the SIM 808, previously presented equations apply by setting $$\Delta\theta_0 = 0$$

$$x'_{03} = 0.5 w_b$$

In yet another implementation, the reflector element 824 may be split, in a manner similar to the reflective element 624 of FIG. 6, to introduce π-phase difference between two halves of the beam.

Figure 9:
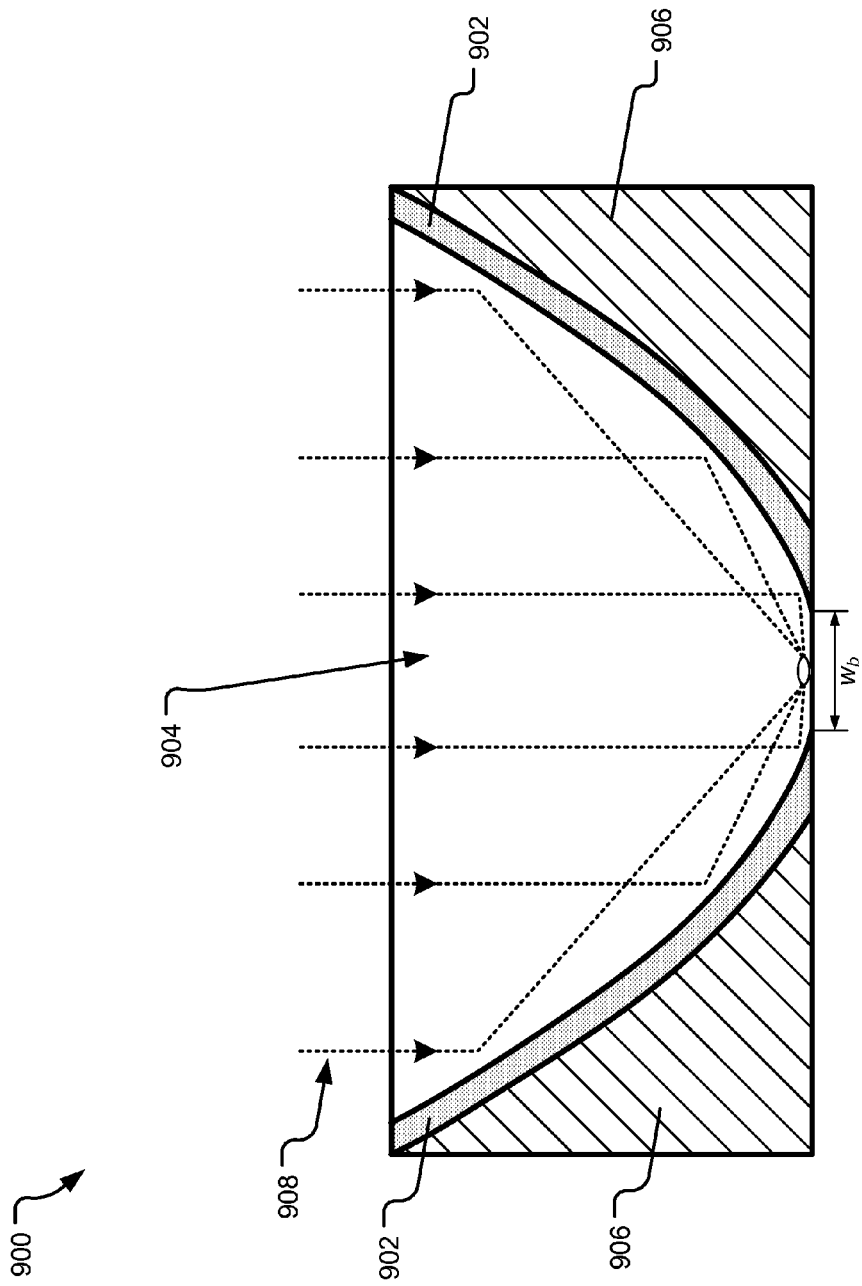
FIG. 9 illustrates a thin transparent dielectric layer between a waveguide and a sidewall of a light delivery system.

FIG. 9 illustrates a thin transparent dielectric layer 902 between a waveguide 904 and a sidewall 906 of a light delivery system 900. The dielectric layer 902 has refraction of index greater than the waveguide mode propagation constant, i.e., $n > \beta$. The thickness of the dielectric layer 902 can be analytically determined by maximizing the reflectivity near the angle of incidence of the rays 908, where a dip in reflectivity occurs when the dielectric layer is absent. In one example, a dielectric layer thickness of ~100 nm at a light wavelength of 830 nm. Similar characteristics may apply to other reflective elements (e.g., reflective elements 622 and 624 in FIG. 6, reflective elements 722 and 724 in FIG. 7, and reflective elements 822 and 824 in FIG. 8).

Figure 10:
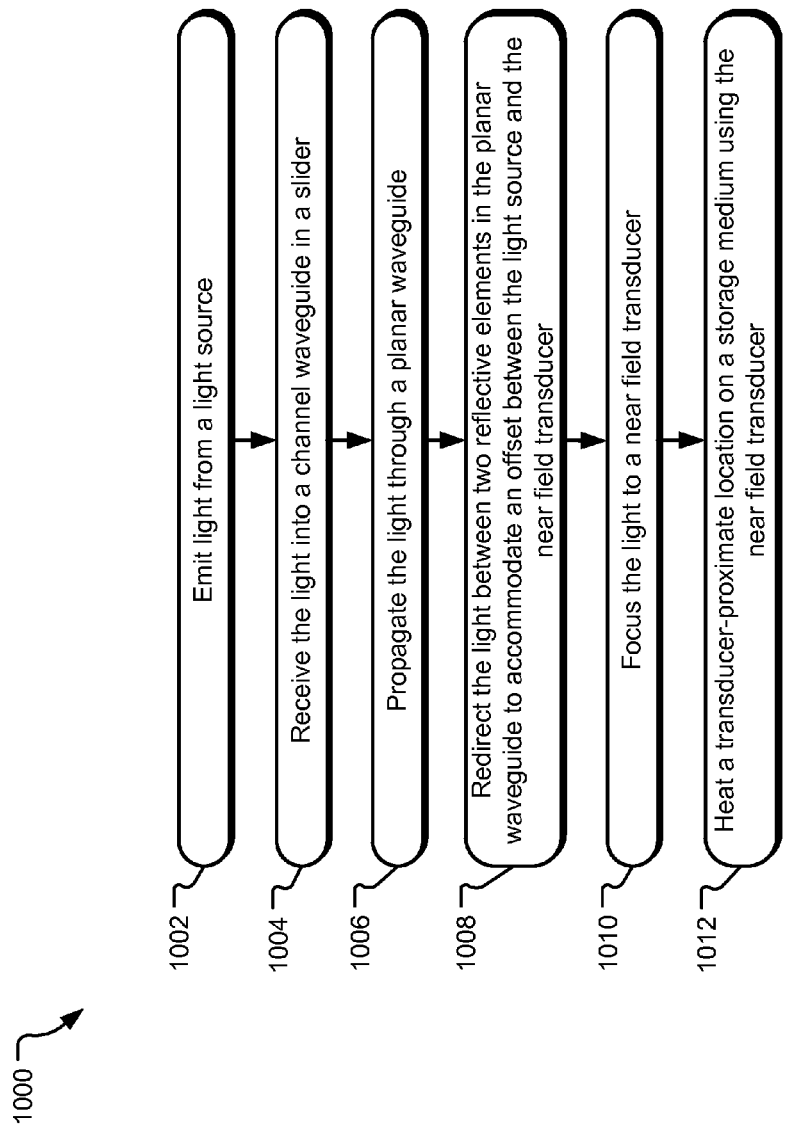
FIG. 10 illustrates example operations for heating a location on a storage medium by delivering light to an NFT in a slider.

FIG. 10 illustrates example operations 1000 for heating a location on a storage medium by delivering light to an NFT in a slider. An emitting operation 1002 emits light from a light source (such as a laser diode). A receiving operation 1004 couples the light into a channel waveguide formed in a slider. A propagation operation 1006 propagates the light through a planar waveguide in the slider.

An offsetting operation 1008 redirects the light between two reflective elements in the planar waveguide to accommodate an offset between the light source and the NFT. Where no offset is desired, the offsetting operation 1008 may be omitted, such that the light propagates from the channel waveguide through the planar waveguide to a focusing element, such as a SIM.

A focusing operation 1010 focuses the light to the NFT, such as via a SIM. A heating operation 1012 heats a location on a storage medium using the NFT (such as via surface plasmon effects).

It should be understood that a laterally asymmetric SIM may be used in offset implementations of the described technology, along with various combinations of canted, curved, split, and/or angled reflective elements within the slider.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A slider comprising:
   a channel waveguide in the slider, the channel waveguide being configured to receive light from a light source positioned external to the slider;
   a near field transducer positioned at an air bearing surface of the slider, the near field transducer substantially aligned along a single axis with a light emitting output of the light source and the channel waveguide;
   a planar waveguide assembly in the slider, the planar waveguide assembly being configured to receive the light from the channel waveguide and to direct the light to a solid immersion mirror in the planar waveguide assembly, the solid immersion mirror being configured to focus the light to the near field transducer; and
   at least one reflective element configured to direct the light received from the channel waveguide to the near field transducer in combination with the solid immersion mirror.

2. The slider of claim 1 wherein light source is affixed to an exterior surface of the slider, the exterior surface being opposite an air bearing surface of the slider.

3. The slider of claim 1 wherein the channel waveguide in the slider is configured to receive light from the light emitting output of the light source through butt coupling at an exterior surface of the slider.

4. The slider of claim 1 further comprising:
   a transparent dielectric layer positioned between a surface of the solid immersion mirror and a sidewall external to the solid immersion mirror within the slider.

5. The slider of claim 1 further comprising:
   a beam expander formed at a light-emitting end of the channel waveguide.

6. The slider of claim 1 wherein the solid immersion mirror is asymmetric to provide a phase difference between right and left optical rays of an optical path.

7. A data storage system comprising:
   a light source positioned on an exterior surface of a slider opposite an air bearing surface of the slider;
   a channel waveguide in the slider, the channel waveguide being configured to receive light from the light source, wherein the light source is aligned with a first axis associated with the channel waveguide and offset from a second parallel axis associated with a near field transducer in the slider at an air bearing surface of the slider; and
   a planar waveguide assembly in the slider, the planar waveguide assembly being configured to receive the light from the channel waveguide along the first axis and to direct the light to the near field transducer along the second axis.

8. The data storage system of claim 7 wherein the near field transducer is positioned at a distal end of a solid immersion mirror from the light source.

9. The data storage system of claim 7 wherein the planar waveguide assembly of the slider comprises:
   at least one reflective element configured to direct the light received from the channel waveguide to the near field transducer in combination with a solid immersion mirror.

10. The data storage system of claim 7 wherein the planar waveguide assembly further comprises:
    at least two reflective elements configured to direct the light received from the channel waveguide on the first axis to the near field transducer on the second axis.

11. The data storage system of claim 10 wherein at least one of the at least two reflective elements includes a phase-shift-introducing split in the light.

12. The data storage system of claim 10 wherein at least one of the at least two reflective elements is configured to collimate the light directed to a solid immersion mirror.

13. The data storage system of claim 7 wherein the planar waveguide assembly further comprises a transparent dielectric layer positioned between a surface of a solid immersion mirror and a sidewall external to the solid immersion mirror within the slider.

14. The data storage system of claim 7 further comprising:
    a beam expander formed at a light-emitting end of the channel waveguide.

15. The data storage system of claim 7 wherein the planar waveguide assembly comprises a solid immersion mirror in the slider that is laterally asymmetric to provide a phase difference between right and left optical rays of an optical path.

16. The data storage system of claim 7, wherein the light is directed to a solid immersion mirror that is substantially parabolic.

17. The slider of claim 1, wherein the at least one reflective element is concave.

18. The slider of claim 1, wherein the at least one reflective element is substantially flat.

* * * * *